United States Patent [19]

Cires et al.

[11] Patent Number: 4,747,542
[45] Date of Patent: May 31, 1988

[54] NOZZLE FLAP EDGE COOLING

[75] Inventors: Alfredo Cires, Palm Beach Gardens; George D. Lee, West Palm Beach, both of Fla.

[73] Assignee: United Technologies Corporation, Hartford, Conn.

[21] Appl. No.: 38,074

[22] Filed: Apr. 14, 1987

[51] Int. Cl.⁴ .............................................. F02K 1/38
[52] U.S. Cl. ........................... 239/127.3; 239/265.17; 60/271; 60/266; 244/117 A
[58] Field of Search ............ 239/127.1, 127.3, 265.17, 239/265.19, 397.5, 265.35, 265.37; 60/266, 271, 262, 265, 752, 760; 244/117 A

[56] References Cited

U.S. PATENT DOCUMENTS

| | | | |
|---|---|---|---|
| 3,729,139 | 4/1973 | Roberts | 239/127.3 |
| 3,831,396 | 8/1974 | Donaldson et al. | 62/467 |
| 4,081,137 | 3/1978 | Sutton et al. | 239/127.3 |
| 4,277,047 | 7/1981 | Zinnai | 251/362 |
| 4,410,163 | 10/1983 | Scabie et al. | 251/306 |
| 4,544,098 | 10/1985 | Warburton | 239/127.3 |
| 4,575,006 | 3/1986 | Madden | 239/265.29 |

Primary Examiner—Andres Kashnikow
Assistant Examiner—Chris Trainor
Attorney, Agent, or Firm—Edward L. Kochey, Jr.

[57] ABSTRACT

A cooling arrangement for the trailing edge of a nozzle flap 18 has a trailing edge liner 30,54 and a baffle plate 32,55. Air from plenum 22 passes through openings 38,54 to cool the trailing edge liner. Expansion of the nozzle liner 18 causes abutment seal 52 to open, increasing cooling air in proportion to the temperature of the nozzle liner.

5 Claims, 2 Drawing Sheets

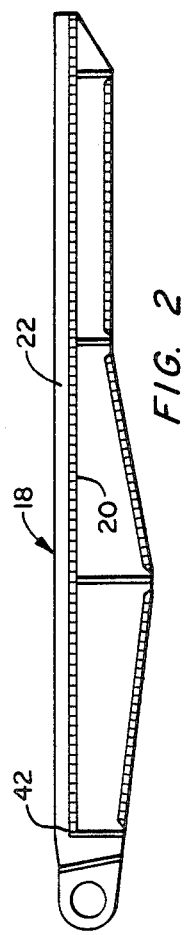
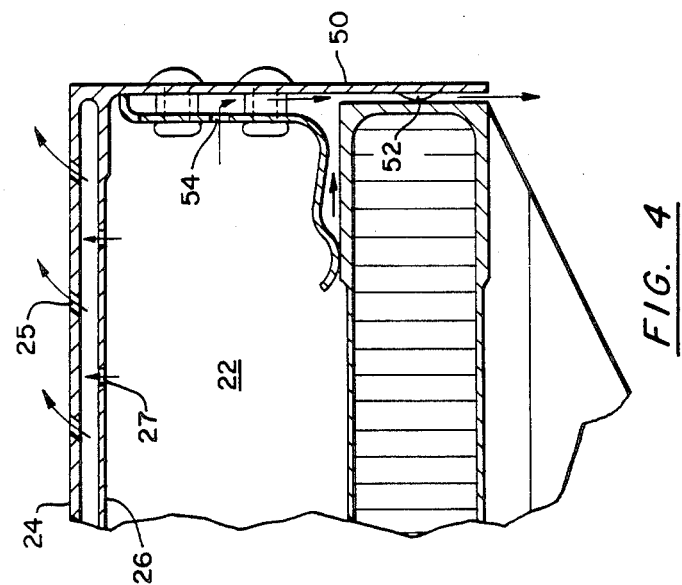
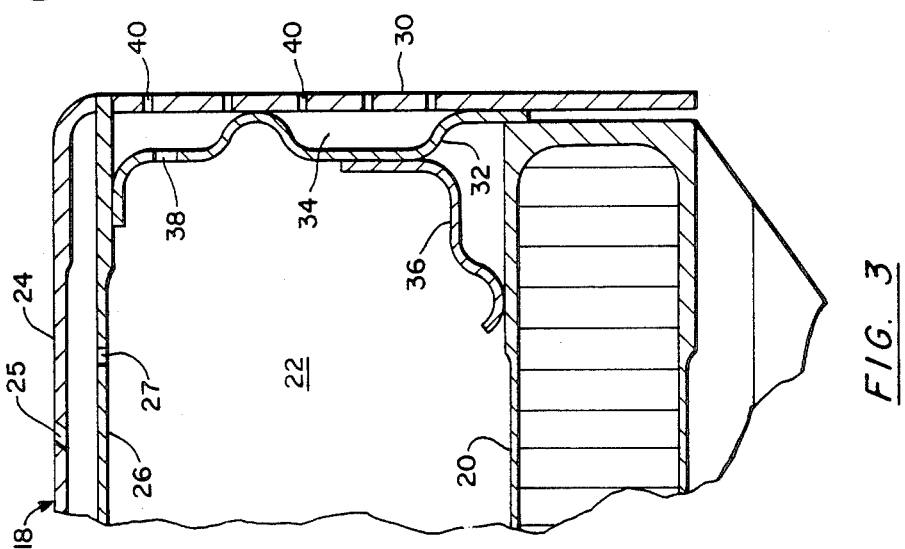

4,747,542

NOZZLE FLAP EDGE COOLING

The Government has rights in this invention pursuant to Contract No. F33615-84-C-3015 awarded by the Department of the Air Force.

TECHNICAL FIELD

This invention relates to movable flap nozzles of gas turbine engines and in particular to the cooling of the trailing edge of the flaps.

BACKGROUND ART

Gas turbine engine discharge nozzles may include variable area and/or variable direction flaps. Such flaps are substantially planular and rotate between opposed parallel side walls of the nozzle.

The flaps must tolerate high temperatures in the order of 1500 F. during high power operation, but experience only lower temperatures at other conditions. It is conventional to supply cooling air to the exposed surfaces of the flaps at locations within the nozzle. Cooling air quantities which are required at high power are wasteful and unnecessary at other conditions, since such cooling is not needed and the air bypasses the turbine thereby resulting in decreased power.

The trailing edge of each flap is not exposed to the mainstream gas flow as it passes through the nozzle. However, the hot mainstream gas will eddy as it leaves the nozzle and reattach to the downstream edge of the nozzle, resulting in overheating. Such overheating may not only lead to failure of the liner surface itself but radiation from the hot surface may damage internal structural members which are not tolerant of such high temperatures.

DISCLOSURE OF THE INVENTION

A moveable nozzle flap for a gas turbine engine includes a structural honeycomb support plate and a nozzle liner spaced therefrom. A trailing edge liner at the downstream end of the nozzle is secured to the nozzle liner extending outwardly therefrom and covering the edges of the support plate as well as a coolant plenum located between the support plate and the nozzle liner. A baffle closely spaced from said edge liner is supported from either the nozzle liner or the edge liner and is sealingly biased against the support plate. This forms a coolant volume between the baffle and the edge liner. Coolant passes from the plenum through the baffle to cool the edge liner, not only resulting in lower temperatures of the liner, but the baffle intercepts radiation from the edge liner to the structural support plate.

The nozzle liner is fixedly secured to the support plate at an upstream location so that relative expansion occurs from the upstream edge. An abutting seal is located between the edge liner and the support plate such that as the nozzle liner heats relative to the support plate and expands, the abutting seal opens thereby permitting an increased flow of coolant air at only these conditions where the high temperatures exist.

BRIEF DESCRIPTION OF THE DRAWING

FIG. 2 is a sectional view through one of the flaps.

FIG. 3 is a first embodiment of the seal arrangement.

FIG. 4 is a second embodiment of the seal arrangement.

BEST MODE FOR CARRYING OUT THE INVENTION

Figure 1:
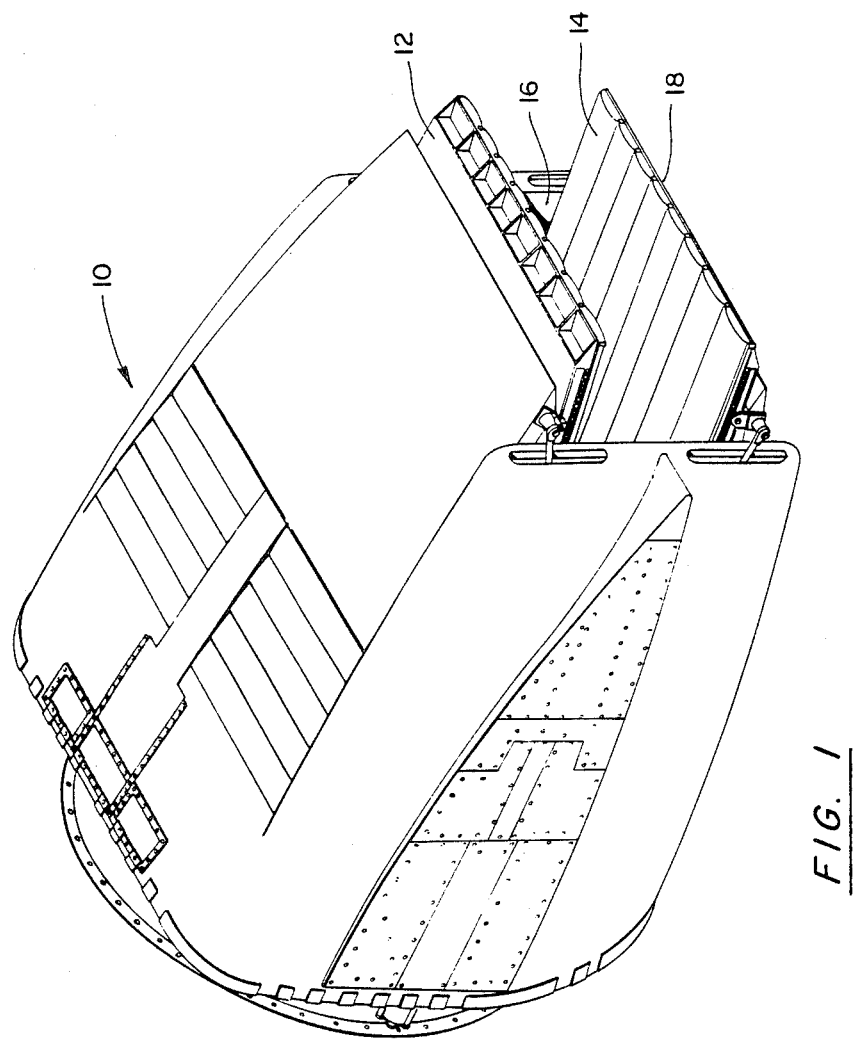
FIG. 1 is a perspective view showing a moveable nozzle flap arrangement for a gas turbine engine.

In FIG. 1 there is illustrated a nozzle assembly 10 for a gas turbine engine including an upper movable flap 12 and a lower movable flap 14. These nozzles may be rotated upwardly or downwardly sealing against side wall 16. The portion of the nozzle exposed to the hot gases passing therethrough is covered by liner 18 which is spaced from honeycomb support structure 20 thereby forming a coolant plenum 22 therebetween.

The liner 18 is comprised of an external liner 24 and an impingement liner 26.

At the trailing edge and therefore at a downstream location there is located a trailing edge liner 30 which is attached to the nozzle liner 18. A baffle plate 32 is secured to the nozzle liner forming an air volume 34 between the baffle and the edge liner 30. Attached to this baffle is a spring seal 36 which is sealingly biased against the structural honeycomb support plate 20. The liners are of a highly temperature resistant material such as Wasp-alloy while the structural honeycomb planular support plate 20 is of a high strength material such as titanium which is not as temperature resistant. The baffle 32 protects the support plate 20 from radiation from the exposed liner plate 30 thereby protecting it against over heating.

The baffle 32 has a plurality of impingement openings 38 therethrough which direct cooling air from plenum 22 against the edge liner 30. The edge liner in turn has a plurality of smaller openings 40 therethrough permitting the cooling air to flow through the edge plate liner.

The impingement liner 26 has a number of openings 27 therethrough permitting cooling air to flow from plenum 22 impinging against the liner 24. This liner has openings 25 therethrough at an angle of 45 degrees from the vertical permitting the cooling air to pass therethrough to form a cooling film therethrough in the nozzle.

Referring to FIG. 2 the nozzle liner 18 is secured to the honeycomb support structure 20 at an upstream location 42. The liner therefore expands relative to the support structure from the upstream location 42 in an amount proportional to the temperature difference between the two. Accordingly, there is substantial differential expansion during high load operation when high temperature exists within the nozzle. This causes the edge liner 50 of FIG. 4 to move to the right permitting abutment seal 52 to open up with respect to the support plate 22. Coolant air in this embodiment passes from plenum 22 through openings 54 in baffle 55 impinging on liner plate 50, thereafter passing downwardly past seal 52 to exhaust. This permits a modulation in the amount of cooling flow which is proportional to the temperature against which the nozzle must be protected. At low ratings this can be arranged so that there is no significant cooling flow thereby avoiding bypassing of the gas turbine with the cooling air flow.

We claim:

1. A cooling arrangement for the trailing edge of a nozzle flap comprising a structural honeycomb planular support plate;

a nozzle liner spaced from said support plate and forming a coolant plenum therebetween;

a nozzle trailing edge liner secured to said nozzle liner, extending outwardly therefrom and covering the edges of said coolant plenum and said support plate;

a baffle supported from one of said liners and sealing biased against said support plate, said baffle forming a coolant volume between the baffle and said edge liner; and means for passing coolant from said coolant plenum through said coolant volume in contact with said edge liner for cooling said edge liner.

2. The cooling arrangement that is in claim 1:

said means for passing coolant comprising a plurality of impingement holes in said baffle for directing coolant through said baffle against said edge liner.

3. A cooling arrangment as in claim 2:

said means for passing coolant also including a plurality of holes through said edge liner.

4. A cooling arrangment as in claim 2:

said means for passing coolant also including an opening between said edge liner and said support plate.

5. A cooling arrangement as in claim 1:

said nozzle liner fixedly secured to said support plate at a location remote from said edge liner;

an abutting seal between said edge liner and said support plate;

said seal abutting in a direction parallel to the expansion of said nozzle liner from the fixed support, whereby expansion of the liner relative to the support structure opens said abutting seal permitting cooling air to flow therethrough.

* * * * *